(12) United States Patent
Vidal et al.

(10) Patent No.: US 11,817,909 B1
(45) Date of Patent: Nov. 14, 2023

(54) PHASE CORRECTION IN HIGH SPEED COHERENT OPTICAL COMMUNICATION

(71) Applicant: Solanium Labs Ltd., Hod Hasharon (IL)

(72) Inventors: Or Vidal, Hod Hasharon (IL); Yaron Yoffe, Hod Hasharon (IL)

(73) Assignee: SOLANIUM LABS LTD., Hod Hasharon (IL)

( * ) Notice: Subject to any disclaimer, the term of this patent is extended or adjusted under 35 U.S.C. 154(b) by 0 days.

(21) Appl. No.: 17/822,109

(22) Filed: Aug. 24, 2022

Related U.S. Application Data

(60) Provisional application No. 63/236,254, filed on Aug. 24, 2021.

(51) Int. Cl.
*H04B 10/00* (2013.01)
*H04B 10/61* (2013.01)
*H04B 10/035* (2013.01)
*H04J 14/00* (2006.01)

(52) U.S. Cl.
CPC ....... *H04B 10/6165* (2013.01); *H04B 10/035* (2013.01)

(58) Field of Classification Search
CPC .................................................. H04B 10/6165
See application file for complete search history.

(56) References Cited

U.S. PATENT DOCUMENTS

2009/0141831 A1* 6/2009 Tao ................. H04B 10/69
375/325
2022/0294538 A1* 9/2022 Harley ............. H04L 27/2657

* cited by examiner

*Primary Examiner* — Daniel G Dobson
(74) *Attorney, Agent, or Firm* — Reches Patents

(57) ABSTRACT

A method for phase correction, the method may include generating in parallel and by a set of phase error detectors, a set of phase error detection results (PEDRs) related to a set of blocks of digital samples, the digital samples are frequency corrected and represent optical signals conveyed over a coherent optical communication link; wherein the PEDs introduce PED noise that is indifferent to phase errors of the set of the blocks of digital samples; sending, in a sequential manner, the set of PEDRs, to a loop that comprises a loop filter; generating, by the loop, phase difference results, wherein each phase difference result is indicative of a phase difference between a certain PEDR of the PEDRs and a loop filtered PEDR generated by filtering a PEDR that precedes the certain PEDR; and processing, by a phase correction unit, the digital samples and the phase different results, to provide phase corrected digital samples.

10 Claims, 4 Drawing Sheets

PRIOR ART

Generating in parallel and by a set of phase error detectors, a set of phase error detection results (PEDRs) related to a set of blocks of digital samples, the digital samples are frequency corrected and represent optical signals conveyed over a coherent optical communication link; wherein the PEDs introduce PED noise that is indifferent to phase errors of the set of the blocks of digital samples. 220

Sending, in a sequential manner, the set of PEDRs, to a loop that comprises a loop filter. 230

Generating, by the loop, phase difference results, wherein each phase difference result is indicative of a phase difference between a certain PEDR of the PEDRs and a loop filtered PEDR generated by filtering a PEDR that precedes the certain PEDR. 240

Processing, by a phase correction unit, the digital samples and the phase different results, to provide phase corrected digital samples. 250

PHASE CORRECTION IN HIGH SPEED COHERENT OPTICAL COMMUNICATION

BACKGROUND

High speed optical communication links may convey vast amounts of information. Non-limiting examples of such high speed optical communication links are intra data center optical communication links which convey information within a data center. High speed may be regarded having at least fifty Giga symbols per second.

Coherent optical communication requires reconstructing frequency and phase information, and is sensitive to frequency and phase noises. The reconstruction may be executed using a control loop.

A control loop may be applied on a phase of a signal. The control loop may include a phase error detector (PED) for estimating a current phase error, a loop filter (LF) that may perform a phase error calculation in order to determine a desired phase correction, and a phase correction unit (PCU) that corrects the phase error.

There are two types of a control loop—a feedback loop and a feed forward loop.

FIG. 1 is an example of a prior art feedback loop 10 (also known as a closed loop), on which the input signal of the feedback loop is provided to the PCU 11 (which is also fed by delayed output signal of the LF). The output signal of the PCU (phase corrected signal) is provided as an output to the feedback loop and is also provided as an input to the PED 12.

The output of the PED is fed to the LF 13 which in turn outputs a loop filtered signal to a delay unit 14 which outputs a delayed signal to the PCU 11 (to be used for the next cycle), whereas the loop filtered signal is also used by the PCU to correct the phase.

FIG. 2 is an example of a prior art timing diagram 20 of a phase correction process applied by the feedback loop of FIG. 1.

It is assumed that the symbol rate is 59 Giga symbols per second. The system clock is 1 Giga cycles per second.

The PED has to process a block of at least 28 symbols.

The PCU requires one cycle latency to output 56 corrected samples—as illustrated by boxes 30(1), 30(2) and 30(3) that span along three consecutive time slots 51, 52 and 53.

The PED requires one cycle latency to take 28 samples of the 56 corrected samples and generate a single PED output—as illustrated by boxes 31(1), 31(2) and 31(3) that span along three portions of the time slots 51, 52 and 53.

The LF takes one cycle to take the single PED output and calculate new LF outputs—as illustrated by boxes 32(1), 32(2) and 32(3) that span along three other portions of the time slots 51, 52 and 53.

The latency of the feedback loop is three cycles, or 3×56=168 samples.

In a feedforward loop (also known as an open loop), the input signal to the feed forward loop is provided to the PCU and to the PED. The output of the PED is fed to the LF which in turn outputs a loop filtered signal to the PCU, whereas the loop filtered signal is used by the PCU to correct the parameter.

In the feedback loop, the error detection is applied after the phase correction unit (on a corrected signal)—while in the feedforward loop the error detection is applied before the phase correction unit.

Accordingly—the feedback loop can handle higher levels of errors (in comparison to the feedforward loop), as the PED operates on a corrected signal (following the PCU).

The feedback loop is very sensitive to latency, as both the PED and the LF must complete their processing before applying a next correction operation.

The feedforward loop is very sensitive to an original error level of the input signal (input to the feedforward loop), and is less sensitive to latency.

The latency of feedback loops (for example—see FIG. 2—total of 168 samples) is much higher compared to a text book implementation in which the only latency is caused by the PED averaging of 28 samples and the computation itself plus the loop filter should not add more latency.

In high speed coherent optical communication, a source of phase noise is a linewidth of a transmitter laser. Expensive laser (for example lasers that cost few thousand dollars) exhibit a narrower linewidth than cheaper laser (for example lasers that cost a few dollars).

It has been found that when using feedforward loops, the wide linewidths are a critical parameter that limits the throughput of communication. See for example, "Laser Linewidth Limitations for Optical Systems with High-Order Modulation Employing Feed Forward Digital Carrier Phase Estimation", Mattias Seimetz, OFC/NFOEC 2008.

There is a growing need to provide a fast and accurate solution for phase correction—especially in high speed coherent optical communication.

SUMMARY

There may be provided systems, methods, and computer readable medium as illustrated in the specification.

BRIEF DESCRIPTION OF THE DRAWINGS

The embodiments of the disclosure will be understood and appreciated more fully from the following detailed description, taken in conjunction with the drawings in which:

FIG. 5 is an example of a method.

DESCRIPTION OF EXAMPLE EMBODIMENTS

Figure 1:
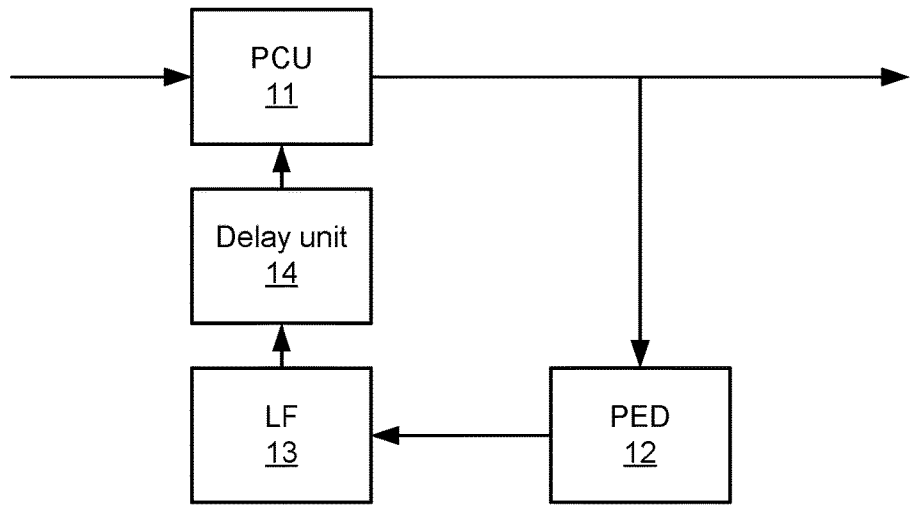
FIG. 1 is an example of a prior art feedback loop.
Figure 2:
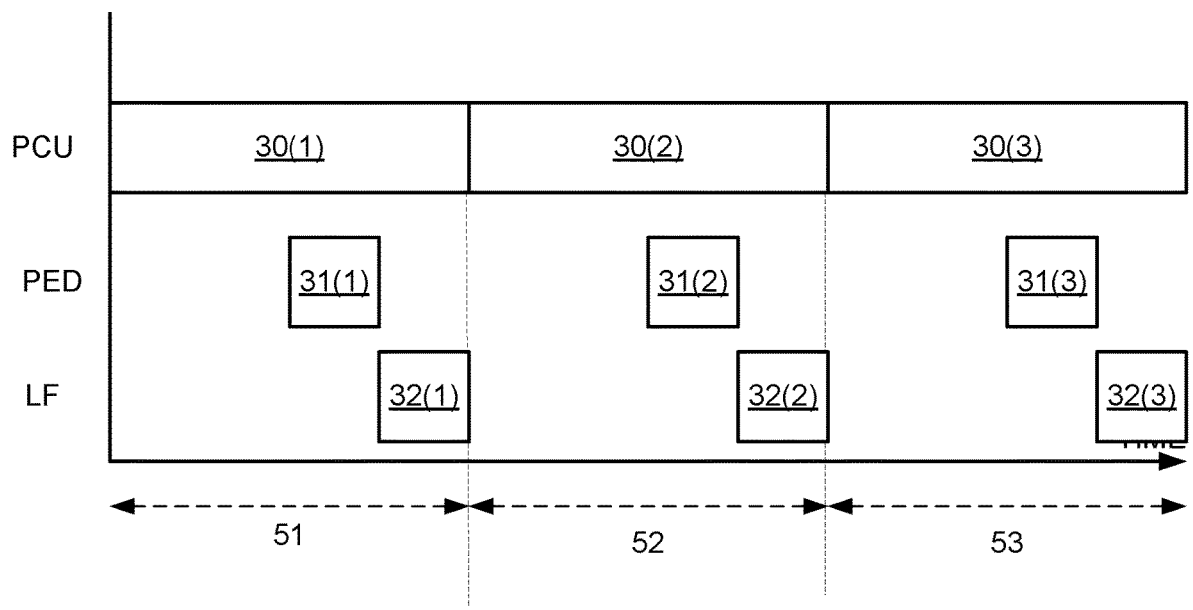
FIG. 2 is an example of a prior art timing diagram of phase correction by the feedback loop of FIG. 1.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The term "and/or" means additionally or alternatively. Thus—A and/or B may be only A, only B or a combination of A and B.

Any reference to consisting should be applied mutatis mutandis to consisting and should be applied mutatis mutandis to consisting essentially of.

There is provided a method, a system and a computer readable medium for phase correction. This solution is parallel in nature and the PEDs and the PCU are not a part of a feedback loop. The feedback loop may include a delay unit, a subtraction unit and a loop filter.

Accordingly—a virtual pipeline is provided in which the PEDs, the PCU and the LF are different stages of the virtual pipeline—and can operate concurrently. The PEDs, PCU operate on a set of blocks of digital signals.

The system may include a phase correction unit in which the PEDs do not have to process a set of phase corrected blocks of digital signals (outputted from the PCU)—but rather only a sets of frequency corrected blocks of digital signal—because each PED is configured to introduce a PED noise that is indifferent to phase errors of the set of the blocks of digital samples. Thus—such PEDs do not lower the accuracy of the loop of the phase correction unit.

Figure 3:
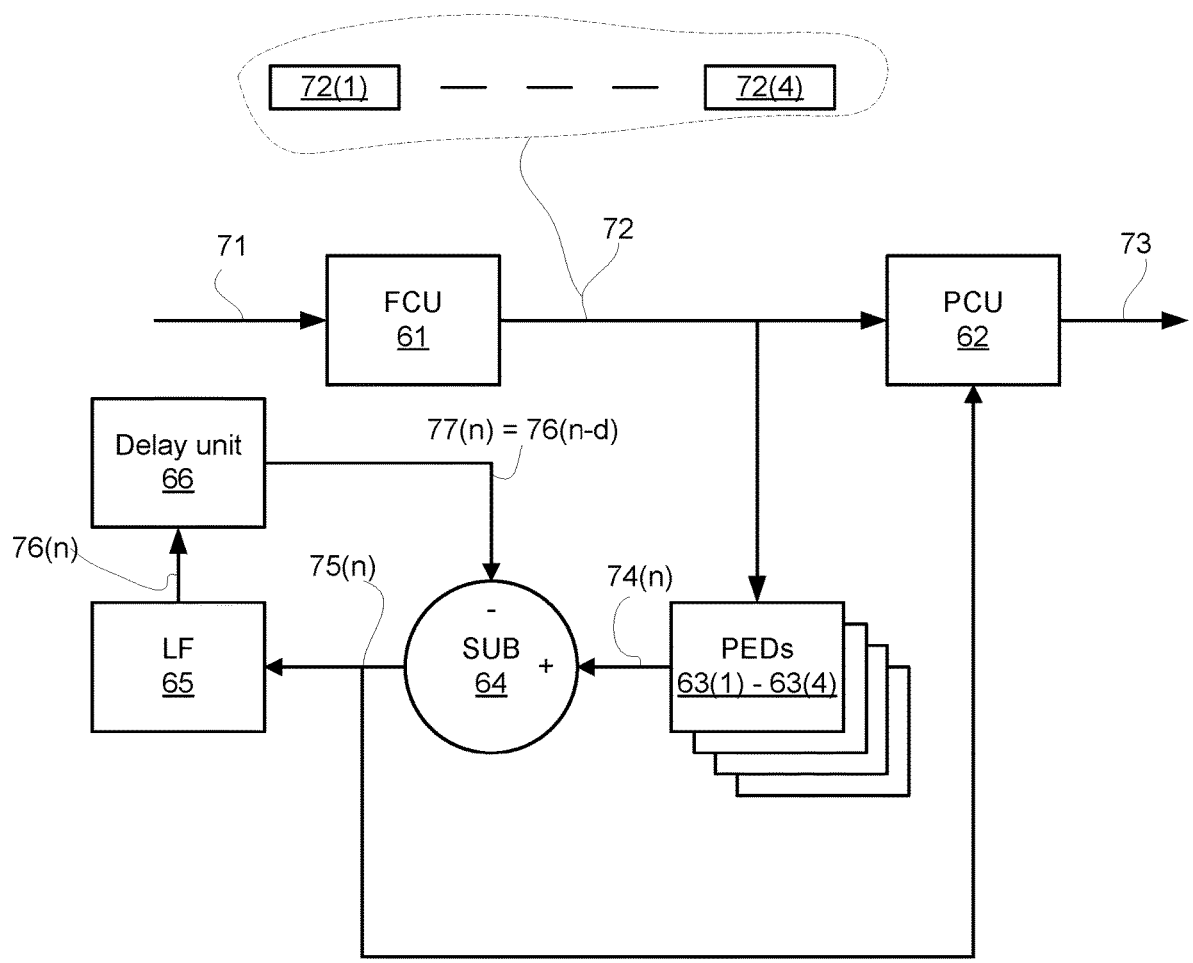
FIG. 3 is an example of a phase correction unit.

FIG. 3 is an example of a phase correction unit 60 and of a timing diagram 80 related to the operation of the phase correction unit 60.

The phase correction unit 60 includes a frequency correction unit (FCU) 61 that receives a set of blocks of input digital signals 71 and performs frequency correction to provide a set of blocks of frequency corrected digital signals 72. This is repeated multiple times—so that multiple sets are received and processed.

The input digital signals 71 represent optical signals conveyed over a coherent optical communication link—for example over a high speed coherent optical communication link.

Figure 4:
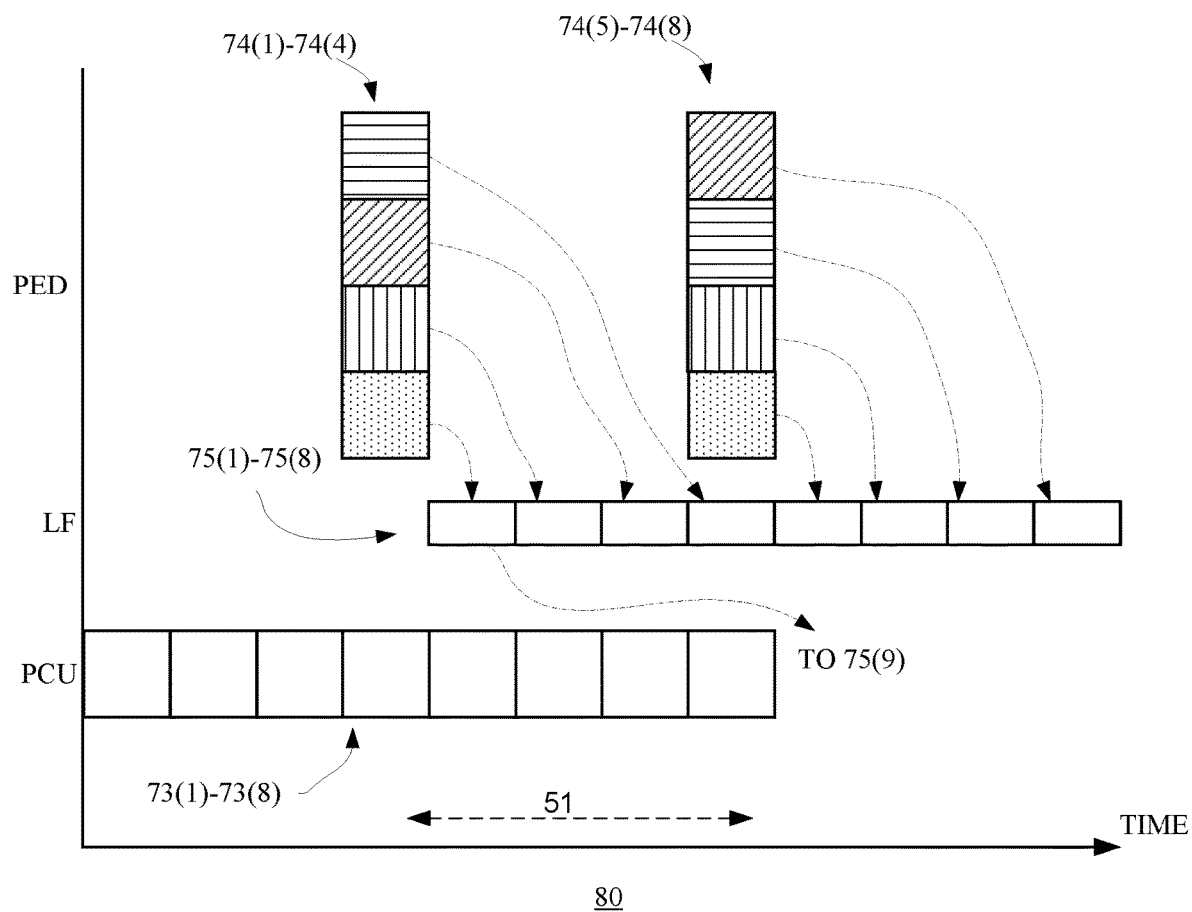
FIG. 4 is an example of a timing diagram of phase correction by the phase correction unit of FIG. 3.

The set of blocks of frequency corrected digital signals 72 is sent to the PCU 62 and to a set of PEDs (for example PEDs 63(1)-63(4)) that generate in parallel, a set of phase error detection results (PEDRs) related to a set of blocks of digital samples. See for example first set of four PEDRs 74(1)-74(4) and a second set of fours PEDRs 74(5)-75(8) of FIG. 4. FIG. 4 also illustrates time slot 51 in which four PEDRs are outputted—in contrary to the time slot 51 of FIG. 1 in which only one PED output was generated.

The PEDs introduce a PED noise that is indifferent to phase errors of the set of the blocks of digital samples.

The PEDRs of the set of PEDRs are sent in a sequential manner to a loop that includes a subtraction unit (denoted SUB) 64, a LF 65, and a delay unit 66.

The subtraction unit 64 has a positive input port (denoted "+") for receiving one PEDR at a time, a negative input port (denoted "−") for receiving one output of the delay unit at a time, and subtracts the PEDR (for example 74(n)) from the output of the delay unit—(for example 77(n))—which is a delayed version (by d blocks) of a previous loop filtered PEDR (denoted 76(n-d)). The previous loop filtered PEDR is outputted from LF 65.

The subtraction may be followed by a residue operation for correcting phase ambiguity. When the delay (d) is small—for example one—the phase ambiguity is limited and thus the phase ambiguities are not expected to exceed 45 degrees.

Denoting a subtraction result (before the residue operation) as delta(n), then a phase difference result 75(n) outputted from the subtraction unit may equal delta(n)—round [delta(n)/(pi/2)]*pi(2).

The subtraction unit outputs phase difference results (such as phase difference result 75(n)). Each phase difference result is indicative of a phase difference between a certain PEDR (74(N)) and a loop filtered PEDR 77(n) generated by filtering a PEDR (76(n-d) that precedes the certain PEDR.

The reduced latency in relation to a prior art loop is illustrated by the following example. It is assumed that the symbol rate is 59 Giga symbols per second. The system clock is 1 Giga cycles per second. The PED has to process a block of at least 28 symbols.

The PCU requires one cycle latency to output 56 corrected samples, but it out of the loop. The FCU is also outside the loop.

The PED uses parallel PED engines to calculate eight PEDs in two cycles, but it is out of the loop.

The LF received in sequence, 4 PEDRs and calculates four LF outputs, the LF completes the task before new four PEDRs arrive.

The PCU receives the LF outputs and corrects each block with a corresponding LF output. The PCU is also not a part of the loop.

The period of the loop is about ½ cycle.

This is corresponding with PED block.

FIG. 5 illustrates a method 200 for phase correction.

Method 200 may include step 220 of generating in parallel and by a set of phase error detectors, a set of phase error detection results (PEDRs) related to a set of blocks of digital samples, the digital samples are frequency corrected and represent optical signals conveyed over a coherent optical communication link; wherein the PEDs introduce PED noise that is indifferent to phase errors of the set of the blocks of digital samples.

Step 220 may be followed by step 230 of sending, in a sequential manner, the set of PEDRs, to a loop that comprises a loop filter.

Step 230 may be followed by step 240 of generating, by the loop, phase difference results, wherein each phase difference result is indicative of a phase difference between a certain PEDR of the PEDRs and a loop filtered PEDR generated by filtering a PEDR that precedes the certain PEDR.

Step 240 may be followed by step 250 of processing, by a phase correction unit, the digital samples and the phase different results, to provide phase corrected digital samples.

The loop may consist essentially of the loop filter, a delay unit, and a subtraction unit; and wherein step 240 may include generating a subtraction result by subtracting the PEDR from a previous loop filtered PEDR, and applying a residue operation on the subtraction result.

For each PEDR of the set of PEDRs, the previous loop filtered PEDR may be an outcome of filtering of a last PEDR before the PEDR. In this case d equals one and the delay unit has a delay that equals a duration of a block of digital signals.

Step 240 may be executed without phase rotation.

Any value or number referred to in the application may be a non-limiting example of such a value of number. For example—the number of taps, the number of FIR filters per group, and the like.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for phase correction, the method comprises:
generating in parallel and by a set of phase error detectors, a set of phase error detection results (PEDRs) related to a set of blocks of digital samples, the digital samples are frequency corrected and represent optical signals conveyed over a coherent optical communication link; wherein the PEDs introduce PED noise that is indifferent to phase errors of the set of the blocks of digital samples;
sending, in a sequential manner, the set of PEDRs, to a loop that comprises a loop filter;
generating, by the loop, phase difference results, wherein each phase difference result is indicative of a phase difference between a certain PEDR of the PEDRs and a loop filtered PEDR generated by filtering a PEDR that precedes the certain PEDR;
processing, by a phase correction unit, the digital samples and the phase different results, to provide phase corrected digital samples.

2. The method according to claim 1 wherein the loop consists essentially of the loop filter, a delay unit, and a subtraction unit; and wherein a generating of a phase difference result related to a PEDR comprises generating a subtraction result by subtracting the PEDR from a previous loop filtered PEDR, and applying a residue operation on the subtraction result.

3. The method according to claim 2 wherein for each PEDR of the set of PEDRs, the previous loop filtered PEDR is an outcome of filtering of a last PEDR before the PEDR.

4. The method according to claim 2 wherein the delay unit has a delay that equals a duration of a block of digital signals.

5. The method according to claim 1 wherein the generating, by the loop, of the phase difference results is executed without phase rotation.

6. A phase correction unit for phase correction, the phase correction unit comprises:
a set of phase error detectors that are configured to generate in parallel, a set of phase error detection results (PEDRs) related to a set of blocks of digital samples, the digital samples are frequency corrected and represent optical signals conveyed over a coherent optical communication link; wherein the PEDs introduce PED noise that is indifferent to phase errors of the set of the blocks of digital samples;
a loop that is configured to:
receive in a sequential manner, the set of PEDRs; the loop comprises a loop filter; and
generate phase difference results, wherein each phase difference result is indicative of a phase difference between a certain PEDR of the PEDRs and a loop filtered PEDR generated by filtering a PEDR that precedes the certain PEDR;
and a phase correction unit that is configured to process the digital samples and the phase different results, to provide phase corrected digital samples.

7. The phase correction unit according to claim 6 wherein the loop consists essentially of the loop filter, a delay unit, and a subtraction unit; and wherein a generating of a phase difference result related to a PEDR comprises generating a subtraction result by subtracting the PEDR from a previous loop filtered PEDR, and applying a residue operation on the subtraction result.

8. The phase correction unit according to claim 7 wherein for each PEDR of the set of PEDRs, the previous loop filtered PEDR is an outcome of filtering of a last PEDR before the PEDR.

9. The phase correction unit according to claim 7 wherein the delay unit has a delay that equals a duration of a block of digital signals.

10. The phase correction unit according to claim 6 configured to generate the phase difference results without phase rotation.

* * * * *